United States Patent [19]

Carmona

[11] Patent Number: 5,362,134
[45] Date of Patent: Nov. 8, 1994

[54] MOTOR-VEHICLE WHEEL

[76] Inventor: Federico Carmona, Via Cellina 8, 33080 Porcia (Pordenone), Italy

[21] Appl. No.: 11,768

[22] Filed: Feb. 1, 1993

[30] Foreign Application Priority Data

Jan. 31, 1992 [IT] Italy ............... PN92 A 000008

[51] Int. Cl.⁵ .................................................. B60B 3/00
[52] U.S. Cl. ................... 301/35.62; 301/105.1; 301/9.1
[58] Field of Search ............. 301/35.62, 63.1, 105.1, 301/111, 114, 37.37, 108.4, 9.1

[56] References Cited

U.S. PATENT DOCUMENTS

| | | | |
|---|---|---|---|
| 2,590,363 | 3/1952 | Adair | 301/9.1 |
| 3,361,482 | 1/1968 | Stevens | 301/35.62 |
| 3,494,669 | 2/1970 | Reppert | 301/35.62 |
| 3,649,079 | 3/1972 | English | 301/35.62 |
| 3,834,766 | 9/1974 | Thousand | 301/35.62 |
| 4,478,458 | 10/1984 | Flexman | 301/37.38 X |

FOREIGN PATENT DOCUMENTS

| | | | |
|---|---|---|---|
| 2722943 | 12/1977 | Germany | 301/35.62 |
| 3442443 | 5/1986 | Germany | 301/63.1 |
| 521407 | 8/1957 | Italy | 301/35.62 |
| 859193 | 1/1961 | United Kingdom | 301/35.62 |

*Primary Examiner*—Russell D. Stormer
*Attorney, Agent, or Firm*—Wenderoth, Lind & Ponack

[57] ABSTRACT

Wheel structure for mounting a tire to a hub-supporting drum of a motor vehicle includes a wheel, a spacer flange interposed between a hub of the wheel and the hub-supporting drum of the motor vehicle, and an adapting flange by which the hub of the wheel is fixed to the hub-supporting drum of the motor vehicle. The central hub of the wheel has a central hole by which the wheel is centered on the hub-supporting drum of the motor vehicle, and a plurality of peripheral holes. Each of the peripheral holes includes an elongate slot extending longitudinally in the radial direction of the hub. The number and distribution of these peripheral holes is such that the wheel can be mounted to any of the various wheel mounts provided on the hub-supporting drum of the motor vehicles which can use that specific size wheel.

7 Claims, 4 Drawing Sheets

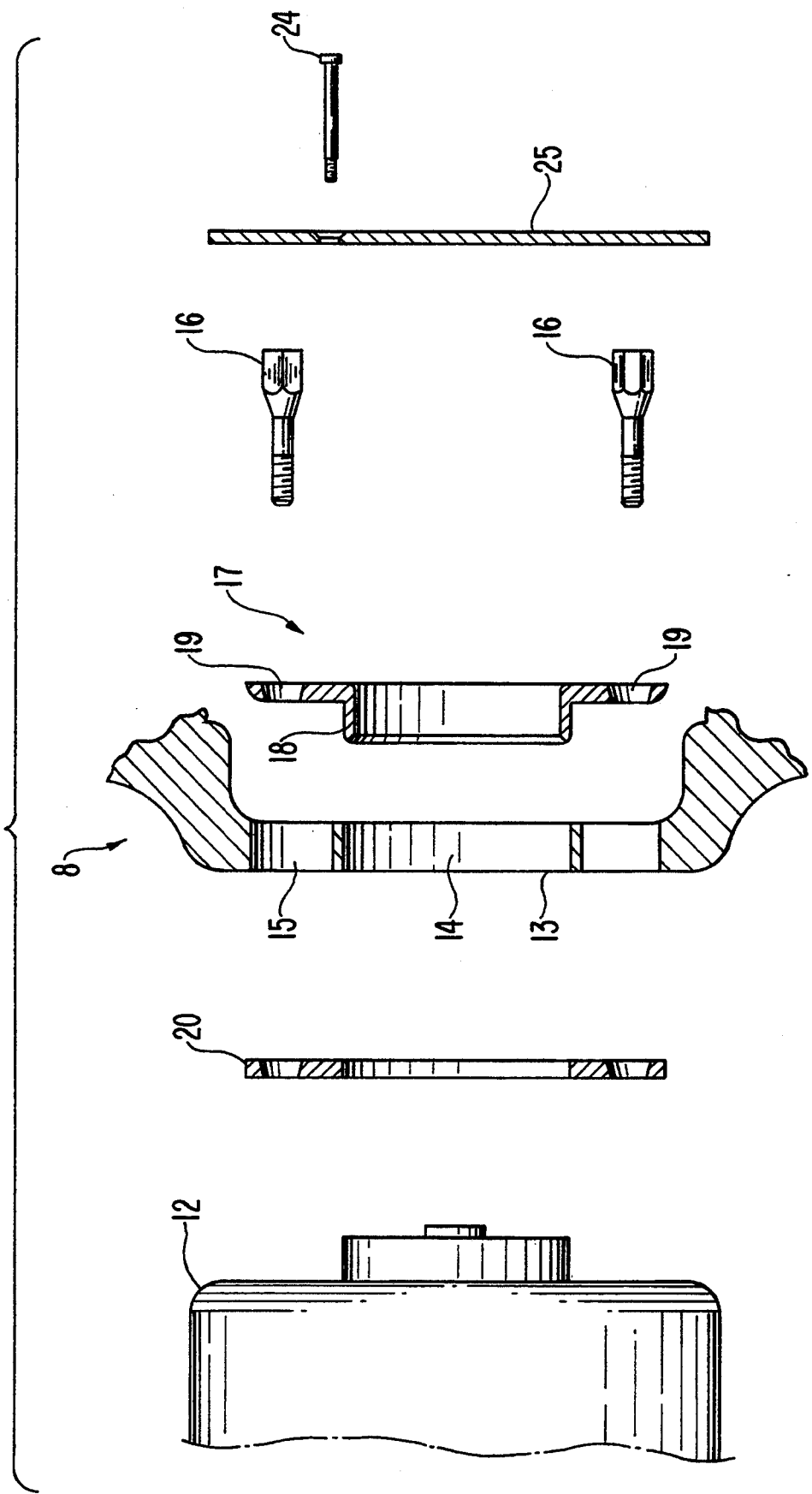

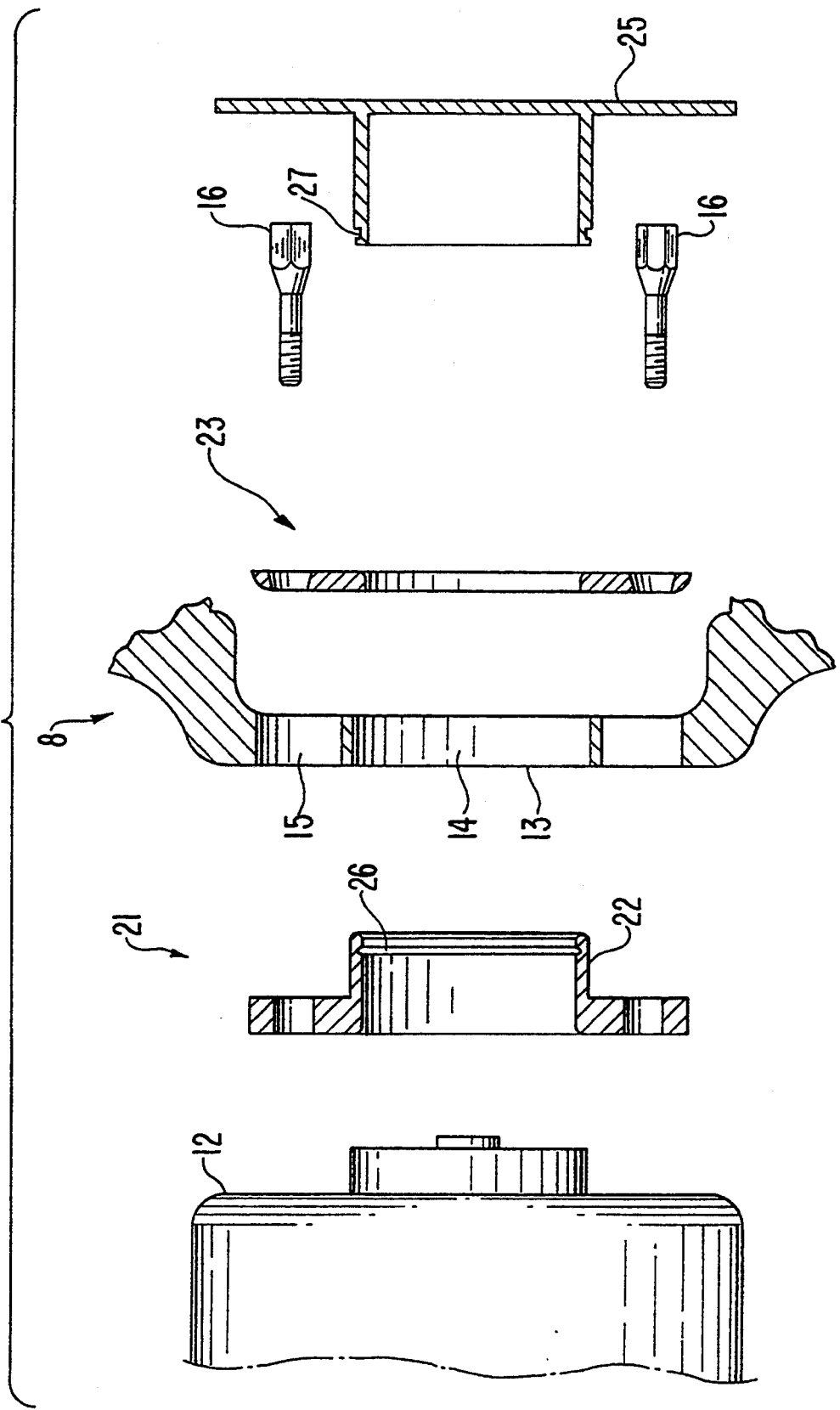

MOTOR-VEHICLE WHEEL

BACKGROUND OF THE INVENTION

The present invention relates to a motor vehicle wheel, and in particular a disc wheel adapted to be fitted to cars.

Generally, motor vehicle wheels are constituted by a rim supporting the tire and a disc connecting the rim to the central hub.

The central hub is configured to permit the wheel to be coupled to the hub-supporting drum of the car and is provided with a central hole for centering thereof and with peripheral holes for receiving the bolts which secure the wheel to the drum.

Frequently, motorists will also seek to use special body wheels of metallic alloys, which are shaped in accordance with particular aesthetical preferences.

In order to meet with the various dimensional and aesthetic demands in the motor vehicle market, the manufacturers of these special body wheels must design a considerable assortment of wheels and must therefore stock a correspondent number of expensive casting dies.

An even greater inconvenience in the marketplace occurs due to the fact that there are almost always differences in the wheel mounts among cars using wheels of identical sizes (namely having the same diameter and the same rim width), either with regard to the number of holes by which the wheel is fixed to the hub supporting drum or, in the case of the same numbers of fixing holes, with regard to the diameters of and the distances between such centering and/or fixing holes.

Therefore, the manufacturer of special body wheels must manufacture, for each model of wheel, as many variants as there are wheel mounts of the cars in commerce.

Consequently, even if some of these special body wheels were manufactured in minimal amounts, a considerable number of these wheels nonetheless remained in the manufacturers' and retailers' warehouses.

The inconveniences arising due to the variety in the wheel mounts also affects the customer who purchases a car already provided with special body wheels.

In fact, frequently, the user must get rid of his old special body wheels because his new car has wheel mounts which are different from those of the previous car.

Wheels provided with a number and distribution of fixing holes that allow the wheels to be mounted to more than one type of wheel mount are already known.

However, this wheel is somewhat complicated both with regard to its manufacture and with regard to the use thereof.

Moreover, such a known wheel cannot be adapted to different diameters of the centering mechanism of the various wheel mounts.

As should be obvious from above, the production of wheels which are so diverse from each other involves a waste of raw materials and energy needed for their machining, and results in the need for excessive warehouse space on the part of both the manufacturer and the retailer.

SUMMARY OF THE INVENTION

Therefore, it would be desirable, and it is the main object of the invention, to provide a wheel which can be used with various types of wheel mounts which is easy to produce on an industrial scale, which lends itself to commercial distribution, and which is easy to mount.

BRIEF DESCRIPTION OF THE DRAWINGS

The advantageous aspects and features of the wheel according to the invention will be better understood from the following description of a non-limitative example, made with reference to the accompanying drawings of which:

FIG. 7 represents an exploded and partially cutaway view of the assembly including the wheel, the fitting up flanges and the end of the hub supporting drum to which they are fitted;

FIG. 8 represents an alternative embodiment of the fitting up flanges.

DETAILED DESCRIPTION OF THE PREFERRED EMBODIMENTS

Figure 1:
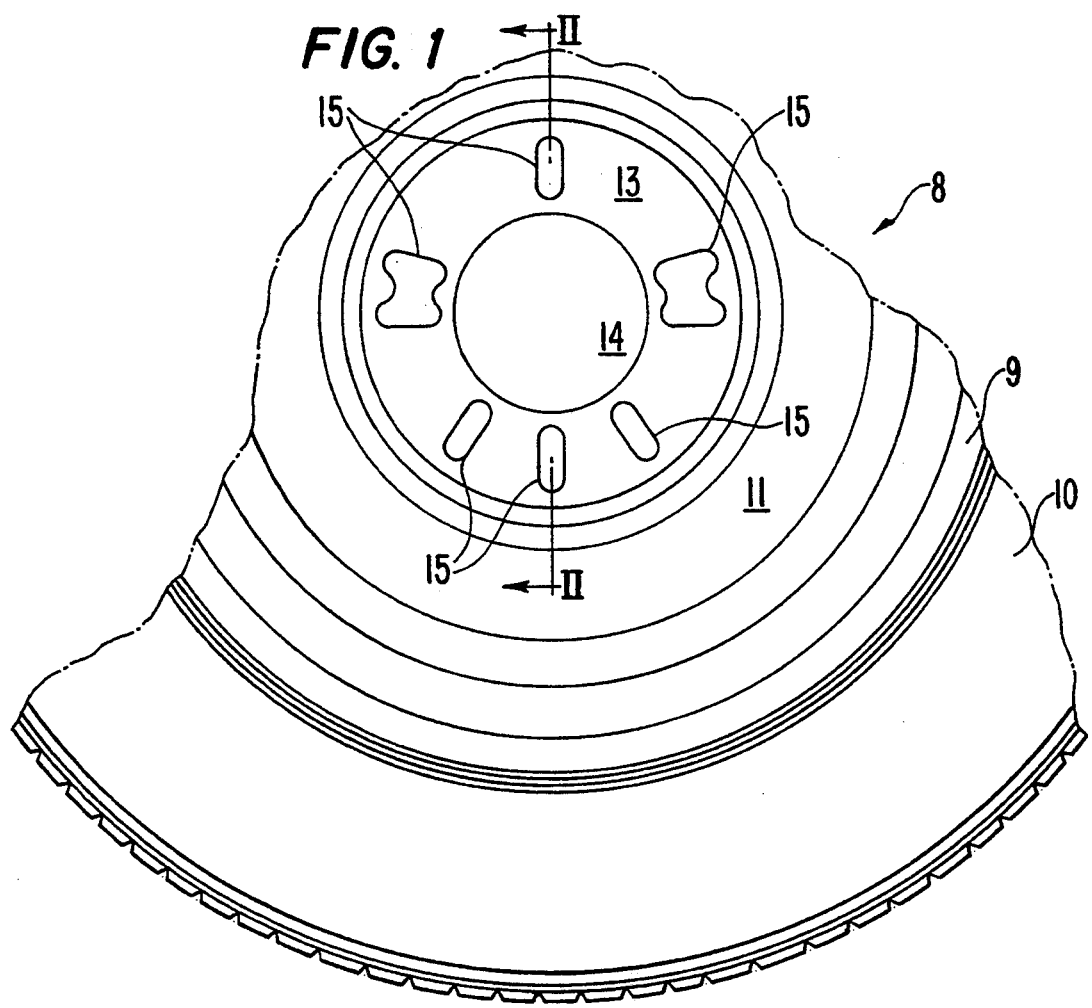
FIG. 1 is a side view of part of the wheel according to the invention.
Figure 2:
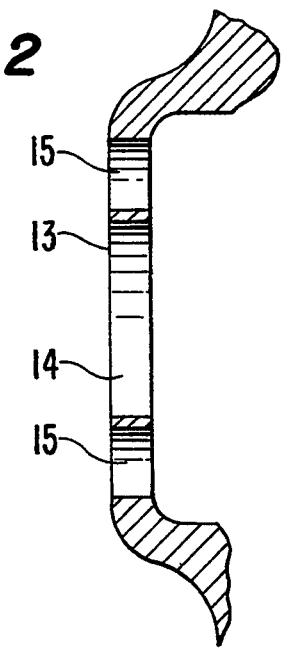
FIG. 2 is a sectional view of the central hub of the wheel as taken along line II—II of FIG. 1.

FIGS. 1 and 2 illustrate the central part of the car wheel 8 of the present invention. The wheel 8 is substantially constituted by a rim 9 supporting the tire 10 and a disc 11 which connects the rim 9 to the central hub.

The central hub, in a known manner, permits the wheel 8 to be coupled to the hub supporting drum 12 (FIG. 7). In particular, the central hub of the disc 11 has a flat surface 13 upon which the wheel 8 rests against the hub supporting drum 12. In a known manner, a central hole 14 for centering the wheel 8, and peripheral holes 15 for receiving corresponding fixing screws 16 (FIG. 7), by which the wheel 8 is fixed to the drum, extend through the central hub.

According to the invention, the central hole 14 and the peripheral holes 15 are so dimensioned and shaped as to allow the wheel, having a given diameter and width of the rim 9, to be mounted to any of the various drums.

In particular, the central hole 14 has a diameter equal to the maximum size required by the cars which can use a wheel of such size. The number and distribution (circumferential spacing) of the peripheral holes 15 are such that the wheel can be fixed at both four and five points to a drum. Moreover, because each of the holes 15 comprises a radially extending slot, bolts can be received therein at various positions from the centers of the holes 15, namely along various diameters which pass through the holes 15.

The wheel 8 defining the holes 14 and 15 can thus be fitted to cars which use the same size wheels but which have different means for mounting the wheels.

Figure 3:
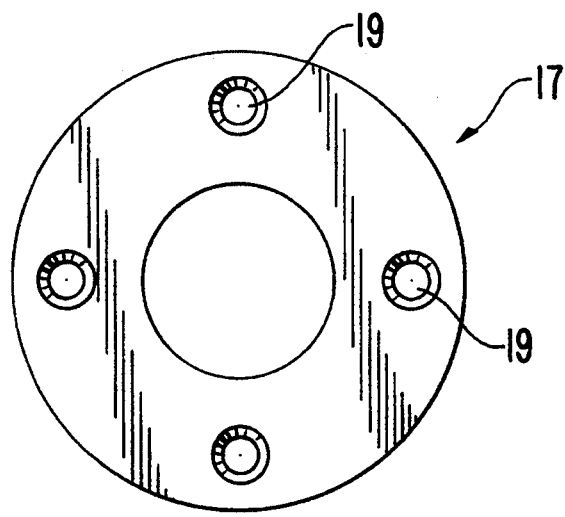
FIGS. 3 and 4 are, respectively, a side view and a sectional view of an adapting flange for securing the wheel according to the invention to a hub-supporting drum.
Figure 4:
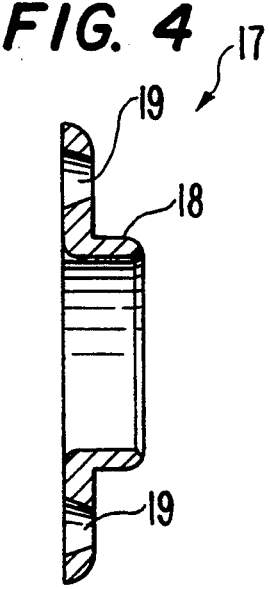
Figure 5:
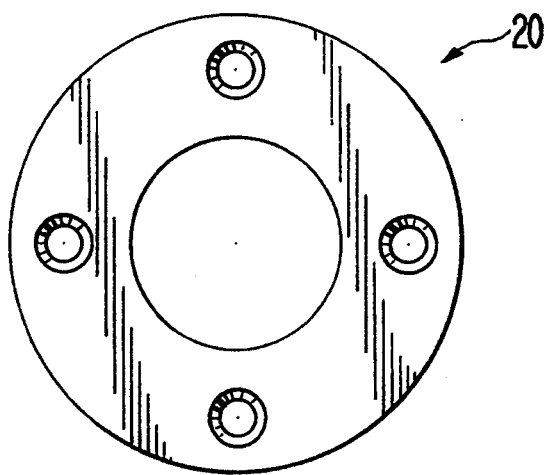
FIGS. 5 and 6 illustrate, similar to FIGS. 3 and 4, a spacer flange for fitting up of the wheel according to the invention.
Figure 6:
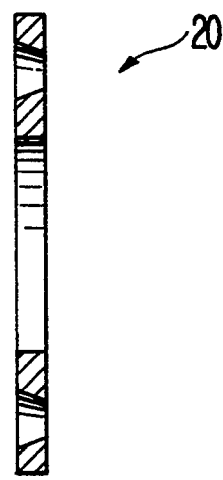

In fact, according to the invention, an adapting flange 17 provides a correct fit of the wheel 8 on the car to which the wheel is to be fitted (FIGS. 3 and 4).

The adapting flange 17 is constituted by an annular metal plate (of steel, for instance), and a central bushing 18. Holes 19, extending through the periphery of the flange 17, are positioned and sizes according to the characteristics of the car to which the wheel 8 and the flange 17 are to be mounted.

For instance, among the cars using 7×15" size wheels, there are cars having drums provided with four fixing holes spaced from one another by distances of 98 mm and a central hole having a diameter of 58 mm, and other cars having drums provided with five holes spaced from one another by distances of 114.3 mm and a central hole having a diameter of 67 mm.

In the first embodiment, the adapting flange has four passage holes 15 spaced from each other by distances of 98 mm and a central bushing having a 58 mm inner diameter.

In the second embodiment, the adapting flange 17 has five holes spaced from each other by distances of 114.3 mm and a central bushing having a 67 mm inner diameter.

It is also to be noted that some other car models are provided with drums having the same fixing holes but with a central hole of a different diameter or a different offset between the surface 13 of the wheel 8 and the center line of the groove of the rim 9.

In the former case, it is sufficient to provide a flange 17 having an adequately dimensioned central bushing 18.

In the latter case, according to the invention, a spacer flange 20, having a thickness adapted to achieve the desired offset value of the wheel 8, is interposed between the drum 12 and the wheel 8. The spacer flange 20 is made of metal (for instance, aluminum) of annular shape and is provided with the holes 14, 15 permitting the correct fixing of the wheel 8 thereto.

When mounting the wheel 8 according to the invention, the spacer flange 20 is firstly laid onto the drum 12 (FIG. 7), which flange for some car models may be also provided with openings for receiving eventual centering grub screws provided on the drum 12.

Thereafter, the supporting surface 13 of the wheel 8 is laid on the flange 20, and the adapting flange 17 is coupled to the drum 12 with the fixing screws 16, thereby fixing the wheel 8 to the drum as can be understood from FIG. 7.

When a large offset of the wheel 8 from the drum is required, the centering function may be entrusted to a spacer flange 21 provided with an appropriately dimensioned centering bushing 22 (FIG. 8). In this case, a clamping flange 23 having only an annular shape is used (FIG. 8).

From what has been described, it is apparent that the wheel 8 according to the invention lends itself well to being produced, commercially distributed and used. In fact, for obtaining all of the variants of wheels having a same size, one can advantageously start from a single "universal" type of wheel 8 which from time to time is adapted to the car referred to by means of a proper adapting flange 17. Likewise, wheels 8 with different offset values may be assembled between the supporting plane 13 of the wheel 8 and the center line of the groove of the rim 9, by avoiding to provide a correspondent number of wheels in one piece having different offset values.

A so conceived wheel 8 allows to rationalize the production and the storage of wheels of the same size, in that the fixing and offset variables are advantageously resolved by employing either one single additional flange 17 or one additional flange 17 together with one spacer flange 20 or one spacer flange 21 together with one clamping flange 23.

Such flanges contribute only a little to the industrial production costs of the wheel structure and to the overall size thereof. In addition, the wheel structure may be set up prior to delivery to the end user by simply assembling an adapting flange to the wheel. Also the raw materials used in manufacturing the wheel structure and economic capital spent in producing the wheel structure according to the invention are remarkably low because of the numerous variants of the wheel structure which can be realized by assembling the adapting flanges to only one type of wheel. Finally, the wheel according to the invention confers to the manufacturer, the commercial distributor and the end consumer a greater and more immediate flexibility in the use of the universal wheel simply by using the adapting flanges.

Obviously, many changes and variants will become obvious to those of ordinary skill in the art.

For instance, both the wheel 8 and the flanges may comprise elements for the correct positioning thereof on the drum 12 and elements adapted to facilitate their preassembly before their fixing to the car. Furthermore, as can be seen from FIG. 7, the adapting flange 17 may be advantageously provided with means, for instance screws 24, for fitting a hub cover (moldings or hub covering housings 25) over the hub of the wheel, for aesthetic purposes.

In the wheel structure shown in FIG. 8, the means for applying moldings or a hub cover (or hub covering housings 25) may be in the form of an annular slot 26 provided on the inner peripheral wall of the bushing 22 of the spacer flange 21. The profiled edge 27 of the hub covering housings 25 (FIG. 8) may be inserted into such slot 26 and snap-fit to the spacer flange 21.

I claim:

1. Wheel structure for mounting a tire to a hub-supporting drum of a motor vehicle, said wheel structure comprising: a wheel including a rim on which the tire is to be supported, a central hub fixable to the hub-supporting drum, and a disc connecting said rim to said central hub, said central hub having a central hole extending centrally therethrough and which central hole is used to center the wheel on the hub-supporting drum, and a plurality of peripheral holes extending therethrough at locations spaced radially outwardly of said central hole, each of said peripheral holes comprising an elongate slot extending longitudinally in the radial direction of the hub whereby fixing bolts can be received at various radial positions within each of the elongate slots; a spacer flange to be interposed between said hub of the wheel and the hub-supporting drum of the motor vehicle so as to space the wheel from the hub-supporting drum, said spacer flange having a central hole extending centrally therethrough and a plurality of bolt holes extending therethrough at peripheral locations at which the bolt holes are alignable with respective ones of the elongate slots of said hub of the wheel; and an adapting flange by which said hub of the wheel is to be fixed to the hub-supporting drum of the motor vehicle, said adapting flange having a central hole extending centrally therethrough, and a plurality of bolt holes extending therethrough at locations at which the bolt holes of the adapting flange are alignable with respective ones of the elongate slots of said hub of the wheel, and respective ones of the bolt holes of said adapting flange and said spacer flange being alignable.

2. Wheel structure as claimed in claim 1, wherein said adapting flange comprises a central bushing defining the central hole of the adapting flange, and an annular metallic plate extending around said central bushing, the bolt holes of the adapting flange extending through said metallic plate.

3. Wheel structure as claimed in claim 2, and further comprising a hub cover which fits over said adapting flange, and means for fixing said hub cover to said adapting flange.

4. Wheel structure as claimed in claim 1, wherein said spacer flange comprises an annular metallic plate, the bolt holes of said spacer flange extending through said annular metallic plate.

5. Wheel structure as claimed in claim 2, wherein said spacer flange comprises an annular metallic plate, the bolt holes of said spacer flange extending through said annular metallic plate.

6. Wheel structure as claimed in claim 1, wherein said spacer flange comprises a centering bushing and an annular plate extending around said centering bushing, said centering bushing defining the central hole of said spacer flange, and the bolt holes of said spacer flange extending through said annular plate.

7. Wheel structure as claimed in claim 6, and further comprising a hub cover which fits over said adapting flange, said hub cover being engageable with the central bushing of said spacer flange to secure the hub covering in place over the adapting flange.

* * * * *